United States Patent [19]
Park

[11] Patent Number: 5,930,463
[45] Date of Patent: Jul. 27, 1999

[54] TECHNIQUE FOR EMBODYING SELF-DIAGNOSIS IN A FACSIMILE MACHINE

[75] Inventor: Sang-Cheol Park, Gumi, Rep. of Korea

[73] Assignee: SamSung Electronics Co., Ltd., Suwon, Rep. of Korea

[21] Appl. No.: 08/764,075

[22] Filed: Dec. 6, 1996

[30] Foreign Application Priority Data

Dec. 7, 1995 [KR] Rep. of Korea ...................... 95/47554

[51] Int. Cl.[6] .................................................... H04N 1/00
[52] U.S. Cl. ........................... 395/113; 358/404; 358/437
[58] Field of Search .................... 358/400, 406, 358/404, 444, 468, 463, 465, 466, 442, 426, 427, 437; 395/113–117; 399/94, 96, 97; 347/185–190; H04N 1/00, 1/40

[56] References Cited

U.S. PATENT DOCUMENTS

| | | |
|---|---|---|
| 3,937,872 | 2/1976 | Kondo et al. . |
| 4,422,098 | 12/1983 | Logie et al. . |
| 4,849,821 | 7/1989 | Allen et al. . |
| 4,970,599 | 11/1990 | Nobuta ..................................... 358/296 |
| 5,130,805 | 7/1992 | Rikima . |
| 5,253,079 | 10/1993 | Nakatani et al. ........................ 358/426 |
| 5,295,182 | 3/1994 | Fujii . |
| 5,533,171 | 7/1996 | Miura ...................................... 395/111 |
| 5,629,730 | 5/1997 | Park ........................................ 347/188 |
| 5,689,289 | 11/1997 | Watanabe et al. . |

*Primary Examiner*—Kim Yen Vu
*Attorney, Agent, or Firm*—Robert E. Bushnell, Es

[57] ABSTRACT

A technique for embodying self-diagnosis in a facsimile machine including a printer with a recording element for receiving or scanning data and a temperature sensor for sensing a surface temperature of the recording element is performed by sensing an input voltage corresponding to the changed surface temperature of the recording element when a preset number of lines of a document are printed, comparing a reference voltage received when the recording element is not driven with the surface temperature sensed in the sensing step, and providing an error message when the sensed voltage is the same as the reference voltage. Thus, the printing or transmitting is performed only when accurate data is received or scanned, while the printing or transmitting by the successive reception or scanning of white data or black data, being error data, is blocked to prevent unnecessary power dissipation and the waste of recording paper.

10 Claims, 6 Drawing Sheets

TECHNIQUE FOR EMBODYING SELF-DIAGNOSIS IN A FACSIMILE MACHINE

CLAIM OF PRIORITY

This application makes reference to, incorporates herein, and claims all benefits accruing under 35 U.S.C. §119 from an application for METHOD FOR EMBODYING SELF-DIAGNOSIS IN A FACSIMILE earlier filed in the Korean Industrial Property Office on the 7th of December 1995, and there duly assigned Ser. No. 47554/1995.

BACKGROUND OF THE INVENTION

1. Field of the Invention

The present invention relates to a technique for embodying a self-diagnosis function in an image formation device such as a facsimile reproduction machine, and more particularly, to a technique for sensing and reporting abnormalities in data received in a receiving mode or data scanned in a copy mode or transmitting mode.

2. Description of the Related Art

In image formation devices such as facsimile reproduction machines, a central processing unit controls the overall facsimile machine in accordance with a set program once one of a transmitting mode, a receiving mode or a copy mode has been set. A network control unit forms a speech path between a public subscriber's telephone network and a modem under the control of the central processing unit. The modem demodulates an analog signal received via the network control unit into a digital signal and modulates a digital signal from the central processing unit into an analog signal under the control of the central processing unit. A scanner scans a provided document once the transmitting or copy mode has been set to convert it into an image data and supplies the image data to the central processing unit. An operating panel consists of a key matrix equipped with a plurality of keys and provides key data produced by key manipulation to the central processing unit. A printer prints data received or desired to be duplicated under the control of the central processing unit. Additionally, a temperature detecting circuit is internally provided in the printer for sensing a surface temperature of a recording element contained within the printer so as to inform the central processing unit of the sensed temperature thereof. A memory stores received data for detecting a lack of recording paper while printing the document or for detecting the reception of black data or white data in a receiving mode and reads out the stored data under the control of the central processing unit.

The circuit for sensing the surface temperature of the recording element includes a thermistor which contacts the surface of the recording element and has a resistance value which is varied corresponding to the heat generated during the driving of the recording element. A supply voltage is divided in accordance with the resistance value of a resistor connected in series with the thermistor and the divided voltage is supplied to the central processing unit to monitor the overheating of the recording element. The voltage caused by the resistance value of the thermistor at a room temperature of the recording element furnished within the printer is utilized as a reference voltage. The recording element has its surface temperature raised when black data is being printed and becomes excessively heated when two or more pages of black data are successively printed to induce overheating. The overheating causes the central processing unit to block the driving of the recording element when the resistance value of the thermistor is continuously raised by the overheating of the recording element so as to supply a voltage which is higher than the preset value to the central processing unit.

First, the surface temperature of the recording element is sensed by means of the thermistor for preventing a black paper output (i.e., a continuous, solid dark image) in either a copy mode or receiving mode. In the operation of sensing the black paper output, the surface temperature of the recording element is raised when the black sheet of paper is provided for a prescribed period. The resistance value of the thermistor for sensing the temperature of the recording element is raised and the voltage due to the thermistor is increased due to the rising resistance value thereof. If the surface temperature of the recording element is raised due to overheating so as to be over a preset level so as to make the voltage due to the thermistor exceed a preset voltage, the operation of the recording element is inhibited to prevent the black paper output. When a black sheet of paper is provided, the receiving or copy mode is continuously performed until the voltage due to the thermistor reaches the preset voltage due to the overheating of the recording element. That is, the operation of the recording element is stopped only after two or more pages of black sheets have been printed.

The damage resulting from the overheating of the recording element can be prevented, but significant electrical power is wasted. Furthermore, if the thermistor for sensing the overheating of the recording elements is defective, the sheet of papers are continuously printed in black to consume the recording element and recording paper. In addition, when sheets of paper that are not printed but are supplied in blank due to occurrence of a problem on either the sending side or the receiving side of a telecommunication circuit, nothing is read from the blank sheet of paper during scanning, a waste of recording paper and an unnecessary increase in power consumption.

Exemplars of contemporary practice in the art are found in references such as U.S. Pat. No. 5,295,182 to Fujii, entitled Facsimile Device Having Self-Diagnostic Function And Maintenance And Control Method Thereof, U.S. Pat. No. 5,130,805 to Rikima, entitled Image Forming Apparatus With Detection And Indication Of Defective Image Data, U.S. Pat. No. 4,849,821 to Allen et al., entitled Page Check For Copier/Printer, U.S. Pat. No. 4,422,098 to Legie et al., entitled Internal Test Method And apparatus For Facsimile Transceiver, and U.S. Pat. No. 3,937,872 to Kondo et al., entitled Internal Test Method For Facsimile Transceiver. While I have observed that although these exemplars of the art might be read as advocating incorporation of self-diagnostic functions in facsimile machines, I have found that none of these references either recognizes the desirability of or provides an implementation for sensing abnormalities in data received during a receiving mode or in data read by scanning documents during a copy mode or transmitting mode.

SUMMARY OF THE INVENTION

Therefore, it is an object of the present invention to provide an improved image formation process and apparatus.

It is another object to provide a technique for generating an error message by determining that a blank sheet of paper is being provided when a surface temperature of a recording element is not changed and a reference temperature is maintained in a copy mode.

It is still another object to provide a technique for providing an error message when successively scanning data below a reference level by comparing one line data of scanning with the reference level in a copy mode or receiving mode.

It is yet another object to provide a technique for providing an error message by comparing data obtained by scanning one line with a reference level in a copy mode or receiving mode when successively scanning data above the reference level.

It is still yet another object to provide a technique for providing an error message by sensing whether black data or white data is received in a receiving mode.

These and other objects may be achieved with self-diagnosis techniques incorporated into an image formation apparatus that has a memory for temporarily storing received line data, by sensing and counting the successive reception of line data having the same value, and providing an error message when a count of the successive reception of line data is equal to a preset number of lines. The count is reset in response to reception of line data different from previously received line data. With this technique, printing or transmission is performed only when accurate data is received or scanned, whereas the printing or transmission by the successive reception or scanning of white data or black data, being the error, data is blocked to prevent unnecessary power dissipation and the waste of recording paper.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
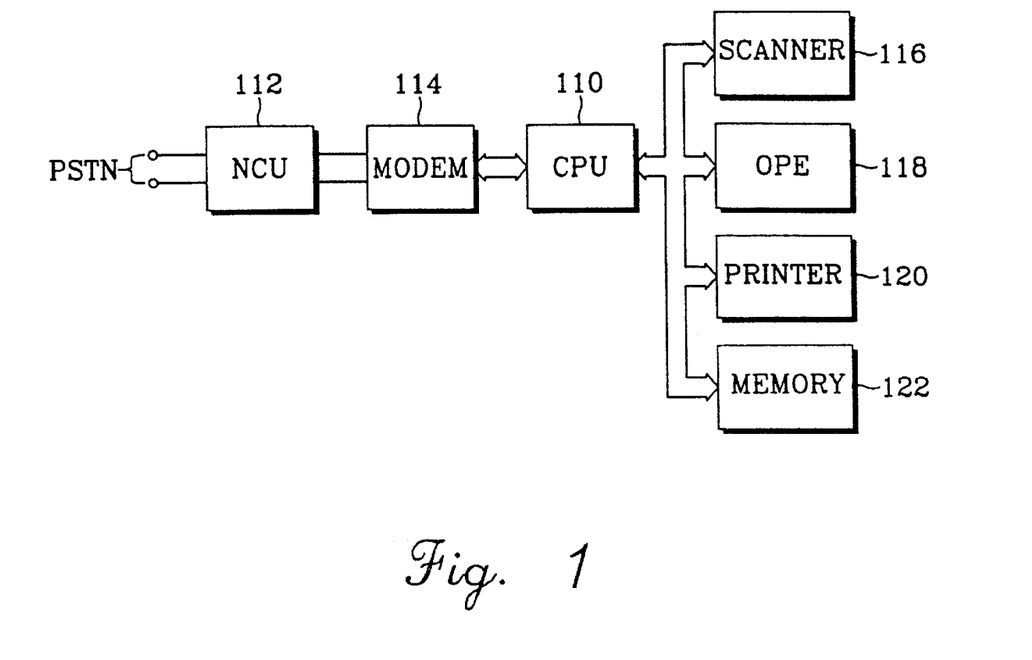
FIG. 1 is a block diagram showing an image formation device.
Figure 2:
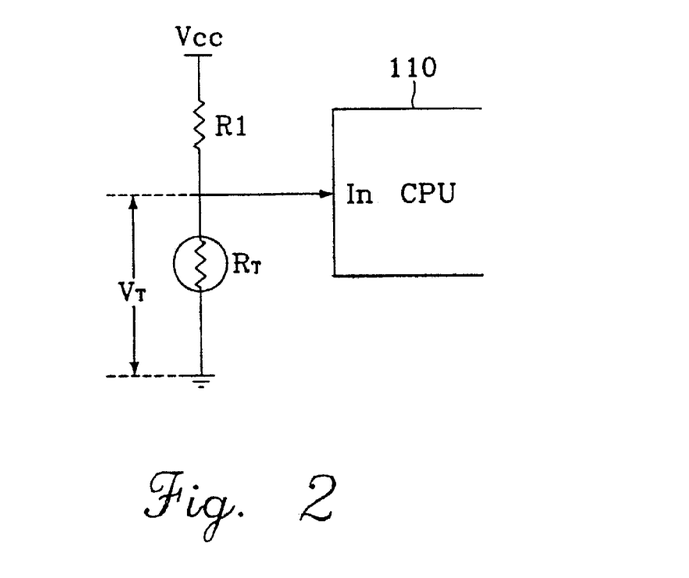
FIG. 2 is a circuit diagram of an arrangement for sensing a surface temperature of a recording element.

Turning now to the drawings, FIG. 1 is a block diagram showing an image formation apparatus such as a facsimile machine, in which a central processing unit (CPU) 110 controls the facsimile machine in accordance with a set program once one of a transmitting mode, a receiving mode or a copy mode has been set. A network control unit (NCU) 112 forms a speech path between a public subscribers' telephone network (PSTN) and a modem 114 under the control of central processing unit 110. The modem 114 demodulates an analog signal received via network control unit 112 into a digital signal and modulates a digital signal from central processing unit 110 into an analog signal under the control of central processing unit 110. A scanner 116 scans a provided document once the transmitting or copy mode has been set to convert it into image data, and supplies the image data to central processing unit 110. An operating panel (OPE) 118 consists of a key matrix equipped with a plurality of keys, and provides key data produced by key manipulation to central processing unit 110. A printer 120 prints data received or desired to be duplicated under the control of central processing unit 110. Additionally, a temperature detecting circuit as shown in FIG. 2 is internally provided to the printer 120 for sensing a surface temperature of a recording element within printer 120 to inform central processing unit 110 of the sensed temperature. A memory 122 stores received data for detecting a lack of recording paper while printing the document or for detecting the reception of black data or white data in a receiving mode, and reads out the stored data under the control of central processing unit 110.

FIG. 2 is a diagram showing the circuit for sensing the surface temperature of the recording element. A thermistor RT contacts the surface of the recording element and has a resistance value which is varied corresponding to the heat generated during the driving the recording element. A supply voltage Vcc is divided in accordance with the resistance value of a resistor R1 and the thermistor $R_T$, and a divided voltage $V_T$ is supplied to central processing unit 110 to monitor the overheating of the recording element. The voltage $V_T$, caused by the resistance value of the thermistor $R_T$ at a room temperature of the recording element furnished within the printer 120, is utilized as a reference voltage. Also, the recording element has its surface temperature raised when black data is being printed, and becomes excessively heated when two or more pages of black data It are successively printed to induce overheating. The overheating causes central processing unit 110 to block the driving of the recording element when the resistance value of thermistor $R_T$ is continuously raised by the overheating of the recording element to supply a voltage $V_T$, which is higher than a preset voltage, to central processing unit 110.

First, the surface temperature of the recording element is sensed by means of the thermistor $R_T$ shown in FIG. 2 for preventing the black paper output in the copy mode or receiving mode. In the operation of sensing a black paper output, the surface temperature of the recording element is raised when the black sheet of paper is provided for a prescribed period (e.g., the time typically taken for printing two or three pages). The resistance value of the thermistor $R_T$ for sensing the temperature of the recording element is raised, and the voltage due to the thermistor $R_T$ is increased due to the rising resistance value thereof. If the surface temperature of the recording element is raised due to overheating so as to be over a preset level so as to make the voltage due to the thermistor $R_T$ exceed a preset voltage, the operation of the recording element is inhibited to prevent the black paper output.

Figure 3A:
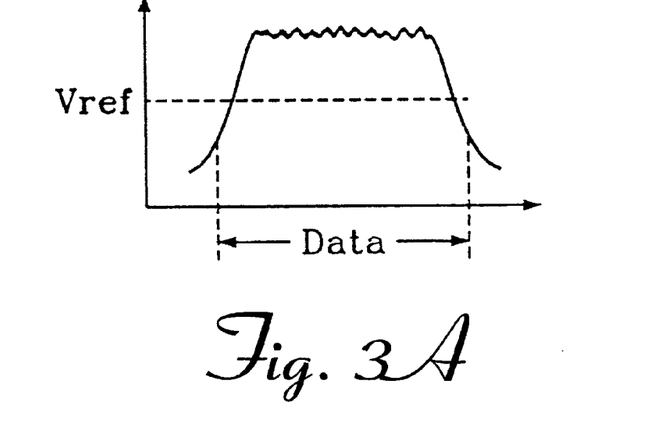
FIGS. 3A–3C show waveforms of data provided after scanning one line in a facsimile machine according to the present invention.
Figure 3B:
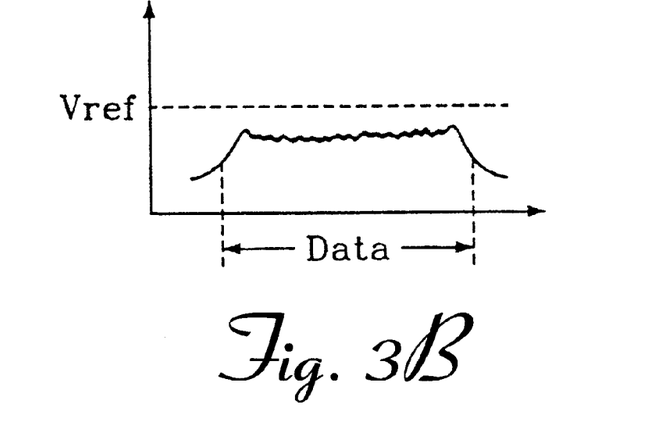
Figure 3C:
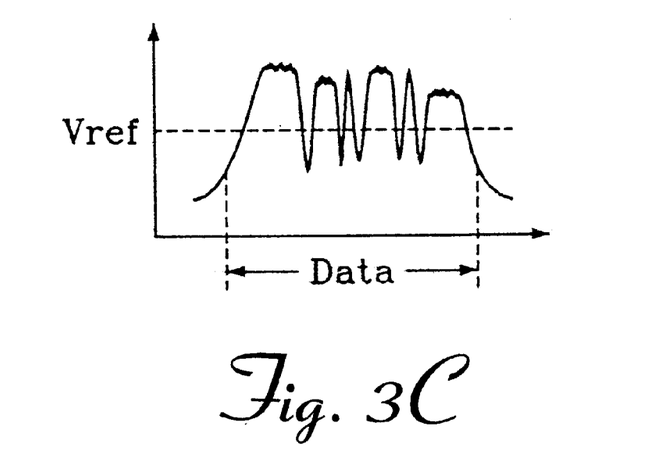

FIGS. 3A–3C show waveforms of output data provided after scanning one line in the facsimile machine according to the present invention. FIG. 3A is a waveform of data provided in the transmitting mode or copy mode when a document being subjected to scanning is a blank sheet of paper, FIG. 3B is a waveform of data provided in the transmitting mode or copy mode when the document being subjected to scanning is a black sheet of paper, and FIG. 3C is a waveform of data provided in the transmitting mode or copy mode when the document for being subjected to scanning is normal.

Figure 4:
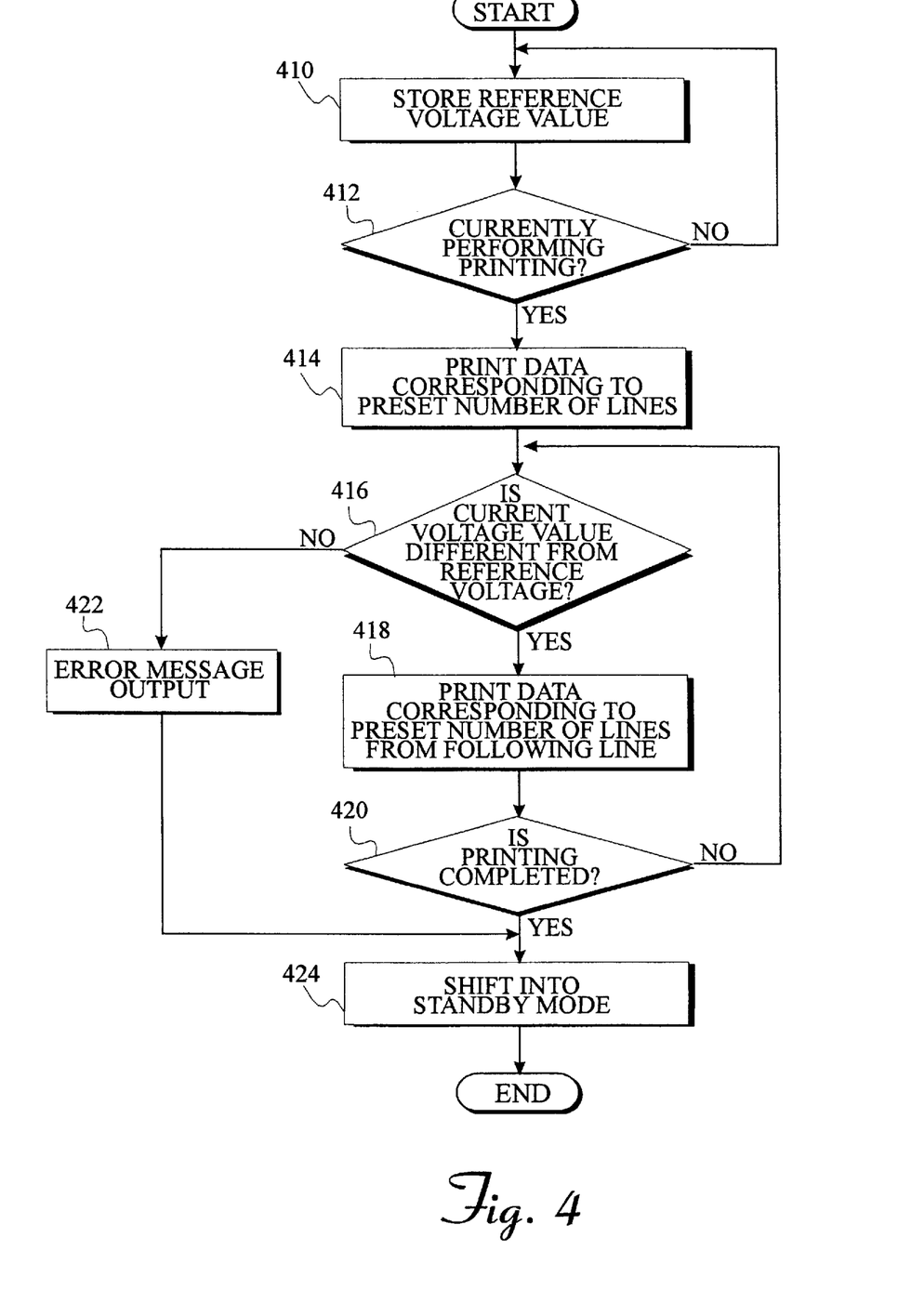
FIG. 4 is a flowchart showing the detecting of successive blank sheets of paper in a copy mode according to the present invention.

FIG. 4 is a flowchart showing the detecting of successive blank sheets of paper in the receiving mode and copy mode according to the present invention, which includes, after a reference voltage having a value under a state that a recording element is not driven is stored and preset lines of the document desired to be duplicated are printed by scanning, the step of determining whether or not a current voltage value differs from the reference voltage. Then, the following preset lines are printed by scanning if there is a difference, and it is determined that blank sheets of paper have been supplied if there is no difference and an error message is provided.

Figure 5A:
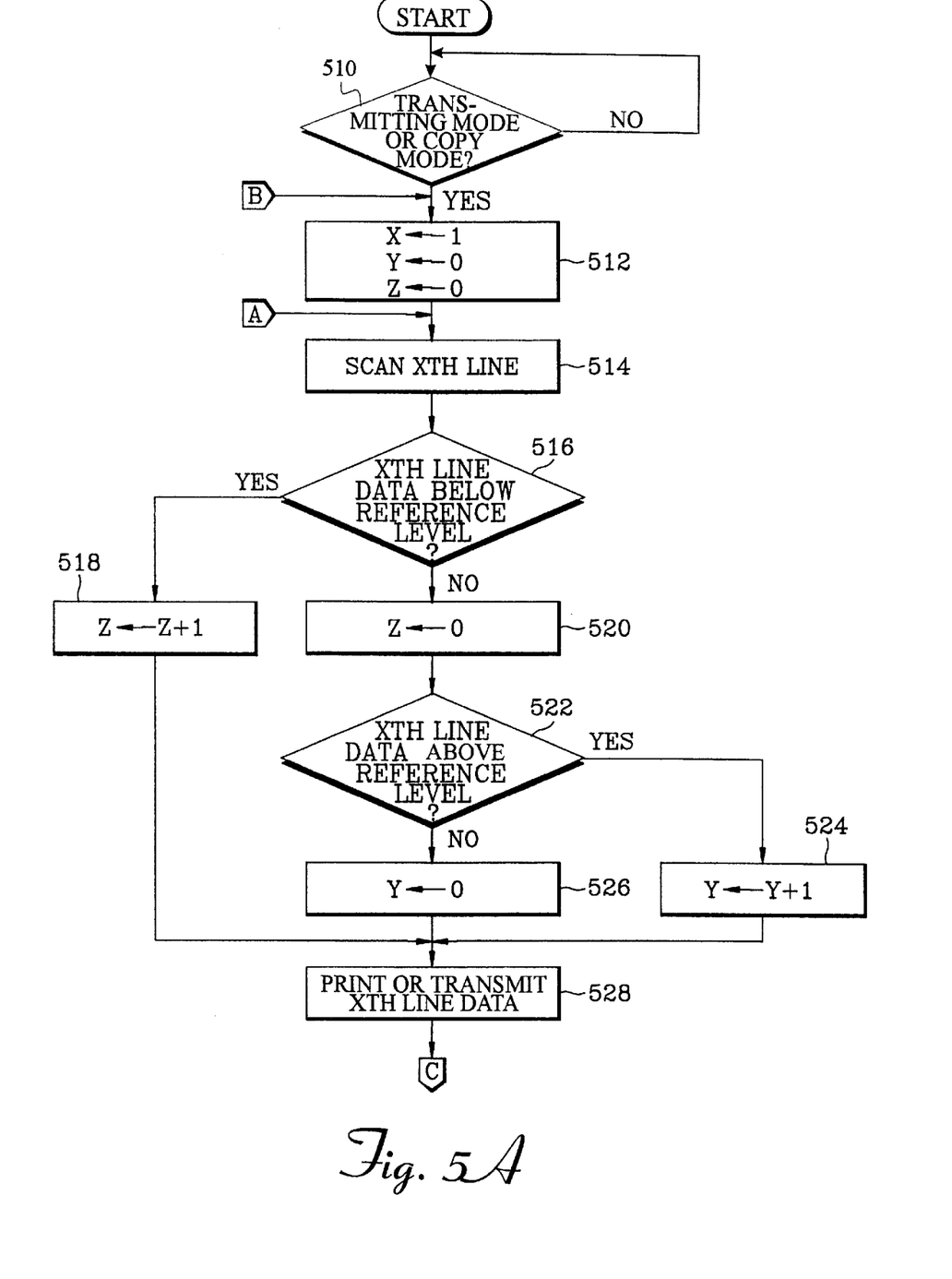
FIGS. 5A–5B together form a flowchart showing the detecting of the scanning of error data in a copy mode or transmitting mode according to the present invention.
Figure 5B:
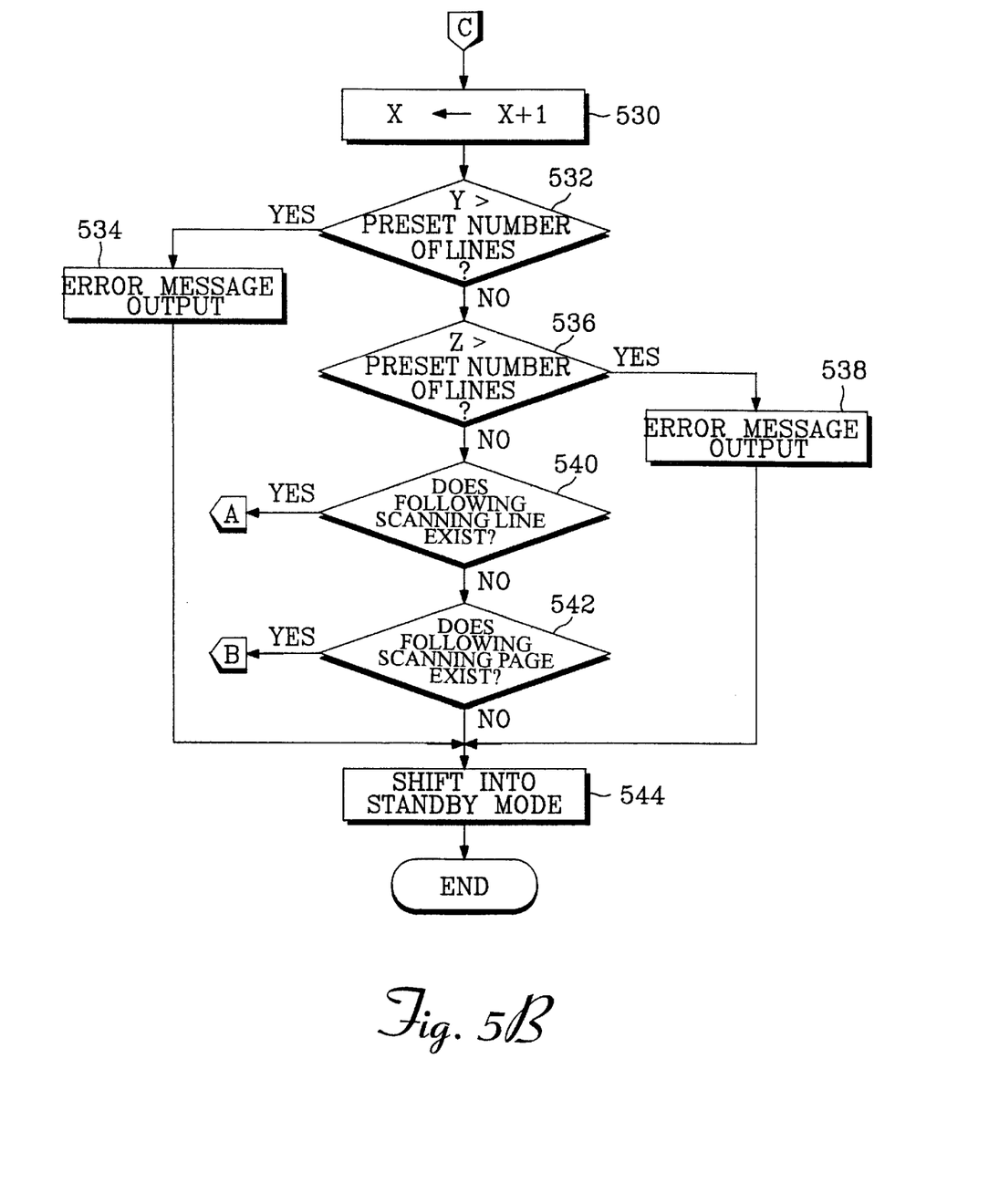

FIGS. 5A and 5B together form a flowchart showing the detecting of the scanning of error data in the copy mode or transmitting mode according to the present invention, which is carried out by the steps of scanning one line of the document intended to be duplicated or transmitted to analyze data corresponding to one line, determining whether or not data below a reference level is successively scanned, and providing an error message when data above or below the reference level is successively scanned for a preset number of lines.

Figure 6:
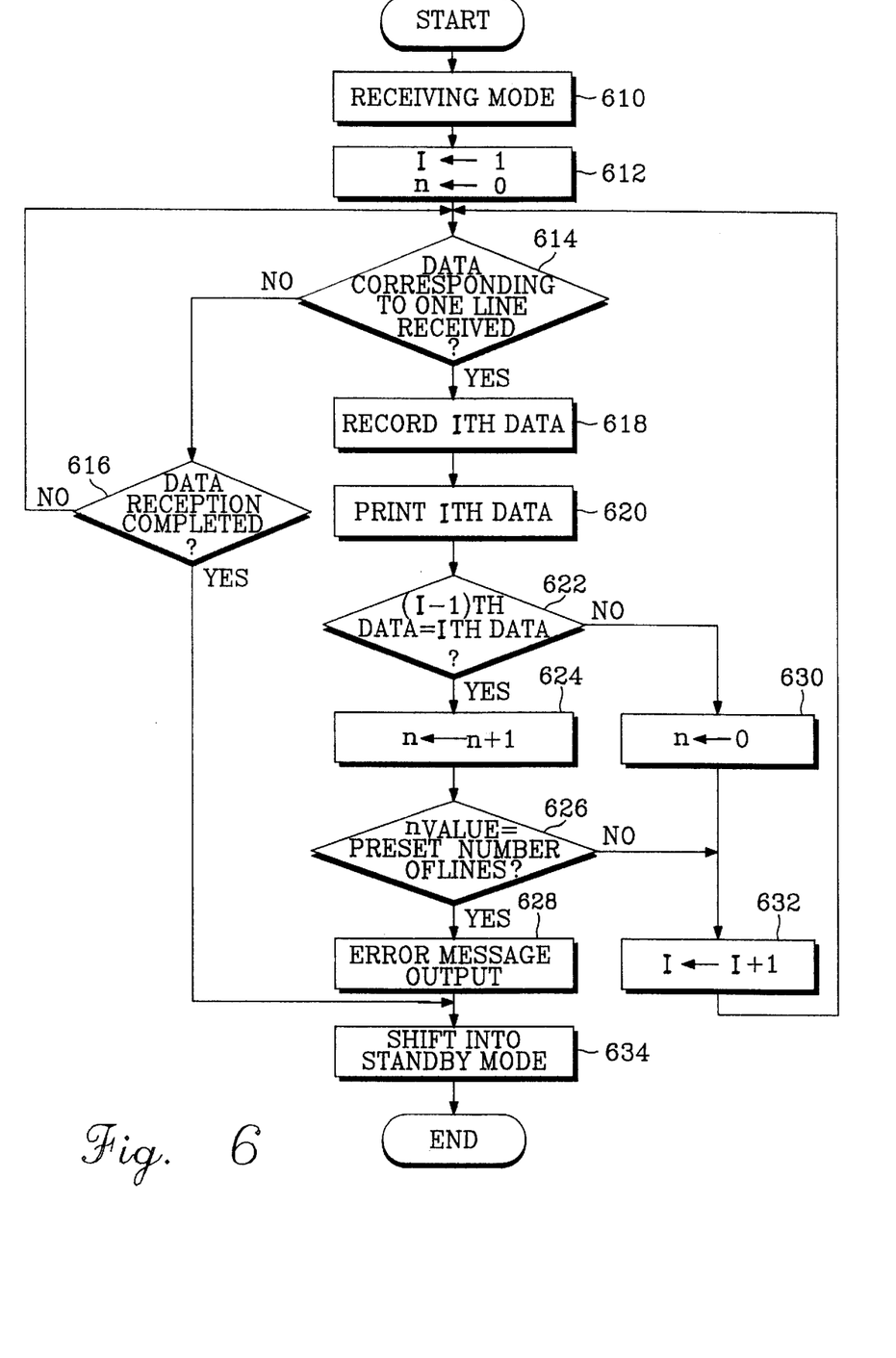
FIG. 6 is a flowchart showing the detecting of the reception of error data in a receiving mode according to the present invention.

FIG. 6 is a flowchart showing the detecting of the reception of error data in the receiving mode according to the present invention, which includes the steps of comparing receiving data with previously-received data, and providing an error message when identical data is successively received for a preset number of times.

One embodiment of an operation according to the present invention will be described in detail with collective reference to FIGS. 1, 2, 3A–3C, 4, 5A–5B and 6. First, one embodiment of detecting the successive printing of blank sheets of paper will be described with reference to FIGS. 1, 2 and 4.

Central processing unit 110 stores a voltage from a temperature sensing circuit as shown in FIG. 2 as a reference voltage before the printer 120 is operated in step 410. When it is determined that the printing function is initialized in step 412, central processing unit 110 receives or scans data corresponding to a preset number of lines (approximately 20 mm~30 mm) to print via printer 120 in step 414. While the data of the preset number of lines is being printed, central processing unit 110 senses whether or not a voltage different from the reference voltage stored in step 410 is received from the temperature sensing circuit as shown in FIG. 2 in step 416.

The reason for sensing the voltage difference is that, if normal data is received or scanned to be printed, the surface temperature of the recording element of the printer 120 is raised, and the raised surface temperature increases a resistance value of a thermistor $R_T$ as shown in FIG. 2. Also, a voltage $V_T$ corresponding to the increased resistor value of thermistor $R_T$ is increased to exceed the reference voltage level. However, if abnormal white data is received or scanned to be printed, the recording element of the printer 120 is neither driven nor involves a change of the surface temperature. Accordingly, the resistance value of the thermistor $R_T$ is maintained at the initial value. In addition, the voltage due to thermistor $R_T$ which maintains the initial resistance value maintains a level identical to the reference voltage, and central processing unit 110 senses the voltage maintaining a level identical to the reference voltage via the temperature sensing circuit to sense the printing of a blank sheets of paper.

When the voltage difference is sensed in step 416, central processing unit 110 determines the normal data printing to proceed to step 418. In step 418, central processing unit 110 prints data corresponding to a preset number of lines (within a range of about 120 mm~130 mm) from the following line after completing the printing operation in step 414 via printer 120. Then, in step 420, a determination is made as to whether or not the printing function has been finished; and then, if not, central processing unit 110 proceeds to step 416 to sense the voltage difference. When it is determined that the printing function has been finished, central processing unit 110 proceeds to step 424 to shift into a standby mode.

If a voltage having a level identical to the reference voltage is sensed after the data corresponding to the preset number of lines has been printed in step 416, central processing unit 110 proceeds to step 422 to provide the error message for informing of the error occurrence and then proceeds to step 424, to shift into the standby mode. The error message output is effected by supplying an alarm sound and printing to provide a message indicating the white data reception on the recording paper.

Referring collectively to FIGS. 1, 3A–3C and 5A–5B, one embodiment of detecting the successive scanning of error data in the transmitting mode or copy mode will be described. Central processing unit 110 determines whether the transmitting mode or copy mode has been set in step 510. Upon the setting of the transmitting mode or copy mode, central processing unit 110 sets a count value (hereinafter simply referred to as "x") for counting scanning lines to one, and sets a count value (hereinafter referred to as "y") for counting the number of lines detected with white data to zero in step 512. Also, a count value (hereinafter referred to as "z") for counting the number of lines detected with black data is set to zero.

Central processing unit 110 scans the xth line via a scanner 116 in step 514. When the data from the scanner 116 is of normal data, the data has the waveform shown in FIG. 3C; when it is of white data, it has the waveform shown in FIG. 3A. In case of black data, the waveform is as shown in FIG. 3B. Central processing unit 110 determines whether or not the data corresponding to the xth line from scanner 116 is below reference level $V_{ref}$ in step 516 which is for determining whether or not the black data is supplied from scanner 116, noting that the waveform of FIG. 3B corresponding to black data has a signal level below the reference level $V_{ref}$. Central processing unit 110 determines whether or not the data corresponding to the xth line exceeds reference level $V_{ref}$ in step 522 which is for determining whether or not white data is supplied from scanner 116, and the waveform of FIG. 3A corresponding to white data has level signal above the reference level $V_{ref}$.

A case of scanning a normal document in step 514 will be taken as an example in the following description. Once the data having the waveform shown in FIG. 3C is provided from scanner 116, central processing unit 110 compares the output data waveform with reference level $V_{ref}$ in step 516, and proceeds to step 520. Since the black data is not successively scanned in step 520, central processing unit 110 sets z to zero, and proceeds to step 522. Central processing unit 110 compares the output data waveform with reference level $V_{ref}$ in step 522, and proceeds to step 526. Central processing unit 110 sets y to zero since white data is not successively scanned in step 522 and proceeds to step 528. Central processing unit 110 transmits data corresponding to the xth line to the receiving side in case of the transmitting mode, and prints data corresponding to the xth line via the printer 120 in case of the copy mode in step 528. After the x value is augmented by one upon the completion of the printing in step 530, it is determined whether or not the y value, being the number of lines detected with white data, exceeds the preset number of lines in step 532, and it is determined whether or not the z value, indicating the number of lines detected with black data, exceeds the preset number of lines in step 536. Also, central processing unit 110 determines whether or not the following lines to be scanned next exist in step 540. When the lines exist, it proceeds to step 514 to scan the next lines. In step 542, it is determined whether or not the following page to be scanned next exists and proceeds to step 512 if it exists, to scan the following page.

A case of scanning a document corresponding to a blank sheet of paper in step 514 will be taken as an example in the following description. Central processing unit 110 compares the data having the waveform shown in FIG. 3A from scanner 116 with reference level $V_{ref}$ in step 516, and proceeds to step 520 since it exceeds reference level $V_{ref}$. Since the black data is not successively scanned in step 520, central processing unit 110 sets z to zero, and proceeds to step 522. Central processing unit 110 compares the output data waveform with reference level $V_{ref}$ in step 522, and proceeds to step 524 since it exceeds reference level $V_{ref}$. Also central processing unit 110 augments the "y" value indicating the successively-supplied number of black data lines by one and proceeds to step 528. Upon the completion of steps 528 and 530, central processing unit 110 determines whether or not the y value indicating the number of lines detected with white data exceeds the preset number of lines in step 532, and proceeds to step 534 when white data for more than a preset number of lines has been successively sensed, providing an error message and shifting into the standby mode in step 544. Otherwise, if it does not exceed the preset number of lines, steps 536, 540 and 542 are executed.

A case of scanning a document corresponding to a black sheet of paper in step 514 will be taken as an example in the following description. Central processing unit 110 compares the data having the waveform as shown in FIG. 3B from scanner 116 with reference level $V_{ref}$ in step 522 and proceeds to step 518 since it is below reference level $V_{ref}$. Central processing unit 110 augments the z value indicating the successively-supplied number of black data lines by one and proceeds to step 528. Upon the completion of steps 528, 530 and 532, central processing unit 110 determines whether z value, being the number of lines detected with black data, exceeds the preset number of lines in step 536, and proceeds to step 538 to provide an error message and shift into the standby mode in step 544 when it is determined that black data for more than a preset number of lines has been successively sensed.

Referring collectively to FIGS. 1 and 6, one embodiment for detecting the successive reception of error data will be described. Under the state that the receiving mode is set in step 610, central processing unit 110 sets a count value (hereinafter referred to as "I") for counting the receiving number of lines to one, and sets a count value (hereinafter referred to as "n") for counting the successive reception of identical data to zero in step 612. Once the setting has been completed, central processing unit 110 proceeds to step 614 to determine whether or not data of one line corresponding to the Ith order has been received. When the data corresponding to one line has been received, it proceeds to step 618. Central processing unit 110 stores data corresponding to the received Ith line in a memory 122 in step 618, and provides the data corresponding to the Ith line to the printer 120 in step 620 to be printed.

Also, central processing unit 110 compares the data corresponding to the 1-Ith line recorded in the memory 122 with the data corresponding to the Ith line in step 622 to determine whether or not they are the same. If white data or black data is successively received, it is sensed by the (I−1)th data being equal to the Ith data in step 622 and central processing unit 110 proceeds to step 624. Central processing unit 110 augments n by one for counting the successive reception of black data or white data in step 624. Also, central processing unit 110 compares whether or not n value is the same as the preset number of lines for determining whether or not black data or white data is successively received for a preset number of lines in step 626. When they are the same, the error message is provided in step 628, and the mode is shifted into the standby mode in step 634. Whereas, if black data or white data corresponding to the preset number of lines is not received, central processing unit 110 augments the I value by one for selecting the following line in step 632 and proceeds to step 614. If different data is received, central processing unit 110 proceeds to step 630 from step 622 to set n, which is the count value of the previously-received black data or white data, to zero and proceeds to step 632.

Is may be understood that the foregoing pages provide a description of the details of a technique for embodying self-diagnosis in a facsimile machine including a printer with a recording element for receiving or scanning data and a temperature sensor for sensing a surface temperature of the recording element is performed by sensing an input voltage corresponding to the changed surface temperature of the recording element when a preset number of lines of a document are printed, comparing a reference voltage received when the recording element is not driven with the surface temperature sensed in the sensing step, and providing an error message when the sensed voltage is the same as the reference voltage. Thus, the printing or transmission is performed only when accurate data is received or scanned, while the printing or transmission by successive reception or scanning of white data or black data, being erroneous data, is blocked to prevent unnecessary power dissipation and the waste of recording paper.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for embodying self-diagnosis in a facsimile machine including a printer with a recording element and a temperature sensor for sensing a surface temperature of said recording element, comprising the steps of:

sensing an input voltage corresponding to a changed surface temperature of said recording element when a preset number of lines of a document have been printed by the printer;

comparing a reference voltage received when said recording element is not being driven with said input voltage corresponding to the surface temperature sensed in said sensing step; and providing an error message when said sensed input voltage is the same as said reference voltage.

2. A method for embodying self-diagnosis in a facsimile machine including a scanner for scanning a document to be transmitted or duplicated and outputting line data corresponding thereto, comprising:

a first sensing step of sensing and counting line data having a value entirely below a reference level;

a second sensing step of sensing and counting line data having a value entirely above said reference level; and an output step of providing an error message when the counted line data of either the first or second sensing step is greater than a preset number of lines.

3. A method for embodying self-diagnosis in a facsimile machine as claimed in claim 2, further comprising the step of resetting the counting when normal line data is sensed in said first and second sensing steps.

4. A method for embodying self-diagnosis in a facsimile machine having a memory for temporarily storing received line data, comprising:

a sensing step of sensing and counting the successive reception of line data having the same value; and an output step of providing an error message when said counted successive reception of line data in said sensing step is equal to a preset number of lines.

5. A method for embodying self-diagnosis in a facsimile machine as claimed in claim 4, further comprising the step of resetting the counting when line data different from previously received line data is received in said sensing step.

6. A apparatus for embodying self-diagnosis in a facsimile machine including a printer with a recording element and a temperature sensor for sensing a surface temperature of said recording element, comprising:

a sensor for sensing an input voltage corresponding to a changed surface temperature of said recording element when a preset number of lines of a document have been printed by the printer;

a comparator for comparing a reference voltage received when said recording element is not being driven with said input voltage corresponding to the surface temperature; and a means for providing an error message when said sensed input voltage is the same as said reference voltage.

7. An image formation apparatus, comprising:

a scanner for scanning documents to be transmitted and duplicated, and generating line data corresponding to images borne by the documents;

a first sensor sensing and making a first count of line data having a value entirely below a reference level;

a second sensor sensing and making a second count of line data having a value entirely above said reference level; and output means for generating an error message when one of said first count and said second count is greater than a value of a preset number of lines.

8. The apparatus of claim 7, further comprising a processing unit resetting said first count and said second count when normal line data is sensed by said one of said first sensor and said second sensor.

9. An apparatus for embodying self-diagnosis in an image formation apparatus, comprising:

a memory for temporarily storing received line data;

a sensor for sensing and writing in said memory, counts of successive reception of line data having the same value; and an output means for providing an error message when said counted successive reception of line data by said sensor is equal to a preset number of lines.

10. The apparatus of claim 9, further comprising means for resetting said counts written within said memory when line data different from previously received line data is received by said sensor.

* * * * *